(12) United States Patent
Haddad et al.

(10) Patent No.: US 9,608,901 B2
(45) Date of Patent: Mar. 28, 2017

(54) SYSTEM AND METHOD FOR ENABLING SERVICES CHAINING IN A PROVIDER NETWORK

(71) Applicant: TELEFONAKTIEBOLAGET L M ERICSSON (PUBL), Stockholm (SE)

(72) Inventors: Wassim Haddad, San Jose, CA (US); Evgeny Tantsura, Palo Alto, CA (US); Joel Halpern, Leesburg, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 636 days.

(21) Appl. No.: 14/044,452

(22) Filed: Oct. 2, 2013

(65) Prior Publication Data

US 2015/0003455 A1 Jan. 1, 2015

Related U.S. Application Data

(60) Provisional application No. 61/841,047, filed on Jun. 28, 2013.

(51) Int. Cl.
*H04L 12/721* (2013.01)
*H04L 12/851* (2013.01)
*H04L 29/06* (2006.01)
*H04L 12/725* (2013.01)
*H04L 29/08* (2006.01)

(52) U.S. Cl.
CPC ............ *H04L 45/38* (2013.01); *H04L 45/306* (2013.01); *H04L 47/2441* (2013.01); *H04L 47/2483* (2013.01); *H04L 67/00* (2013.01); *H04L 69/22* (2013.01)

(58) Field of Classification Search
None
See application file for complete search history.

(56) References Cited

U.S. PATENT DOCUMENTS 7,298,725 B2 11/2007 Rune
7,733,913 B1 6/2010 Cheung et al.
(Continued)

FOREIGN PATENT DOCUMENTS

| EP | 1387553 A1 | 2/2004 |
| EP | 2226970 A1 | 9/2010 |
| WO | WO 2012/047885 A1 | 4/2012 |

OTHER PUBLICATIONS

P. Quinn, et al., "Network Service Header"; draft-quinn-nsh-00.txt; Network Working Group; Jun. 13, 2013; 20 pages.
(Continued)

*Primary Examiner* — Marsha D Banks Harold
*Assistant Examiner* — Christopher Wyllie

(57) ABSTRACT

A system and method for chaining one or more services in a service provider network. A service chaining policy and associated Service Path Identifier (SPID) are determined at an ingress node with respect to a particular data packet flow. If the service chaining policy involves one or more service nodes to be traversed by the data packet flow, each service node's EIDs and RLOCs are determined. A sequential data exchange process with the service nodes is effectuated using encapsulation of data packets based on the EIDs and RLOCs for obtaining services in accordance with the order of services set forth in the chaining policy.

14 Claims, 5 Drawing Sheets

(56) References Cited

U.S. PATENT DOCUMENTS

| | | | | |
|---|---|---|---|---|
| 7,860,100 | B2* | 12/2010 | Khalid | H04L 41/5003 370/229 |
| 8,170,038 | B2 | 5/2012 | Belanger et al. | |
| 8,284,664 | B1* | 10/2012 | Aybay | H04L 41/12 370/235 |
| 8,339,959 | B1 | 12/2012 | Moisand et al. | |
| 8,583,781 | B2 | 11/2013 | Raleigh | |
| 8,817,625 | B1* | 8/2014 | Zhang | H04L 41/5045 370/235 |
| 2006/0084432 | A1 | 4/2006 | Balasubramanian et al. | |
| 2008/0155087 | A1 | 6/2008 | Blouin et al. | |
| 2008/0177896 | A1* | 7/2008 | Quinn | G06F 9/5055 709/238 |
| 2009/0003364 | A1* | 1/2009 | Fendick | H04L 45/00 370/401 |
| 2009/0037713 | A1* | 2/2009 | Khalid | H04L 12/4633 713/1 |
| 2009/0164583 | A1 | 6/2009 | Zhu | |
| 2009/0259810 | A1 | 10/2009 | Baden et al. | |
| 2010/0148940 | A1 | 6/2010 | Gelvin et al. | |
| 2010/0165985 | A1* | 7/2010 | Sharma | H04L 47/2425 370/389 |
| 2010/0226369 | A9* | 9/2010 | Havemann | H04L 45/00 370/392 |
| 2010/0303083 | A1 | 12/2010 | Belanger et al. | |
| 2011/0055845 | A1 | 3/2011 | Nandagopal et al. | |
| 2011/0295942 | A1 | 12/2011 | Raghunath et al. | |
| 2011/0299419 | A1 | 12/2011 | Fendick et al. | |
| 2012/0002672 | A1* | 1/2012 | Alexander, Jr. | H04L 12/4633 370/392 |
| 2012/0026897 | A1* | 2/2012 | Guichard | H04L 43/028 370/252 |
| 2012/0027016 | A1* | 2/2012 | Filsfils | H04L 45/30 370/392 |
| 2012/0163180 | A1 | 6/2012 | Goel | |
| 2012/0207174 | A1* | 8/2012 | Shieh | H04L 47/125 370/401 |
| 2012/0281540 | A1 | 11/2012 | Khan et al. | |
| 2012/0314573 | A1 | 12/2012 | Edwards et al. | |
| 2013/0003735 | A1 | 1/2013 | Chao et al. | |
| 2013/0163594 | A1* | 6/2013 | Sharma | H04L 45/64 370/392 |
| 2013/0272305 | A1 | 10/2013 | Lefebvre et al. | |
| 2013/0290955 | A1 | 10/2013 | Turner et al. | |
| 2014/0043977 | A1 | 2/2014 | Wiley et al. | |
| 2014/0105216 | A1* | 4/2014 | McDysan | H04L 67/1095 370/400 |
| 2014/0149493 | A1 | 5/2014 | Acer et al. | |
| 2014/0215074 | A1* | 7/2014 | Zhang | H04L 41/5045 709/226 |
| 2014/0241356 | A1* | 8/2014 | Zhang | H04L 45/38 370/392 |
| 2014/0254374 | A1* | 9/2014 | Janakiraman | H04L 47/10 370/235 |
| 2014/0269299 | A1* | 9/2014 | Koornstra | H04L 41/0816 370/235 |
| 2014/0334295 | A1* | 11/2014 | Guichard | H04L 47/2441 370/230 |
| 2014/0334488 | A1* | 11/2014 | Guichard | H04L 45/306 370/392 |
| 2014/0355436 | A1 | 12/2014 | Zhang et al. | |
| 2015/0003455 | A1* | 1/2015 | Haddad | H04L 45/38 370/392 |
| 2015/0081855 | A1* | 3/2015 | Zhang | H04L 41/12 709/220 |
| 2015/0106526 | A1 | 4/2015 | Arndt et al. | |

OTHER PUBLICATIONS

D. Farinacci et al. "LISP Traffic Engineering Use-Cases; draft-farinacci-lisp-te-02"; Internet Engineering Task Force; Jan. 7, 2013; 24 pages.

Zhang Y. et al.: "StEERING: A software-defined networking for inline service chaining", 2013 21st IEEE International Conference on Network Protocols (ICNP), IEEE, Oct. 7, 2013 (Oct. 7, 2013), pp. 1-10.

Openflow 1.1 in Hardware: "I was wrong (again)"; Apr. 29, 2011; 3 pages.

A 100 Gig Openflow 1.1 Switch; Powerpoint slide downloaded from the Internet on Apr. 16, 2013; 1 page.

L. Erran Li et al., "Mosaic: Policy Homomorphic Network Extension", Lux Et Veritas, Yale University Department of Computer Science, May 13, 2010, 15 pages.

Joseph, D.A. et al., "A Policy-aware Switching Layer for Data Centers," in Proc. ACM SIGCOMM, Aug. 2008, pp. 51-62.

McKeown, et al. "OpenFlow: Enabling Innovation in Campus Networks", SIGCOMM, Mar. 14, 2008, the whole document.

OpenFlow Switch Specification, Version 1.1.0 Implemented (Wire Protocol 0x02 ), Feb. 28, 2011, the whole document.

Guo et al: Composition Oriented Web Service Semantic Relations Research. Service Sciences (IJCSS), 2011 International Joint Conference on, IEEE, May 25, 2011 (May 25, 2011).

Lee et al. A context-aware service composition scheme for service overlay network. ICT Convergence (ICTC), 2011 International Conference on, IEEE, Sep. 28, 2011 (Sep. 28, 2011).

J. Postel, "User Datagram Protocol," Aug. 28, 1980, 3 pages, RFC: 768.

"Transmission Control Protocol, DARPA Internet Program Protocol Specification", Sep. 1981, 91 pages, RFC: 793, Information Sciences Institute, University of Southern California, Marina del Rey, California.

C. Hedrick, "Routing Information Protocol," Jun. 1988, 33 pages, Network Working Group, Request for Comments: 1058.

Oran D., "OSI IS-IS Intra-domain Routing Protocol," Feb. 1990, 157 pages, Network Working Group, Request for Comments: 1142.

T. Socolofsky, et al., "A TCP/IP Tutorial," Jan. 1991, 28 pages, Network Working Group, Request for Comments: 1180.

G. Malkin, et al., "RIPng for IPv6," Jan. 1997, 19 pages, Network Working Group, Request for Comments: 2080.

R. Braden, et al., "Resource ReSerVation Protocol (RSVP)—Version 1 Functional Specification," Sep. 1997, 112 pages, Network Working Group, Request for Comments: 2205.

J. Wroclawski, "The Use of RSVP with IETF Integrated Services," Sep. 1997, 33 pages, Network Working Group, Request for Comments: 2210.

J. Wroclawski, "Specification of the Controlled-Load Network Element Service," Sep. 1997, 19 pages, Network Working Group, Request for Comments: 2211.

S. Shenker, et al., "Specification of Guaranteed Quality of Service," Sep. 1997, 20 pages, Network Working Group, Request for Comments: 2212.

J. Moy, "OSPF Version 2," Apr. 1998, 244 pages, Network Working Group, Request for Comments: 2328, The Internet Society.

G. Malkin, "RIP Version 2," Nov. 1998, 39 pages, Network Working Group, Request for Comments: 2453, The Internet Society.

S. Deering, et al., "Internet Protocol, Version 6 (IPv6) Specification," Dec. 1998, 39 pages, Network Working Group, Request for Comments: 2460, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

(56) References Cited

OTHER PUBLICATIONS

K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 Pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
J. Polk et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffServ Service Classes," Aug. 2006, 57 pages, Network Working Group, Request for Comments: 4594, The Internet Society.
L. Andersson, et al., "LOP Specification," Oct. 2007, 135 pages, Network Working Group, Request for Comments: 5036, The IETF Trust.
R. Coltun, et al., "OSPF for 1Pv6," Jul. 2008, 94 pages, Network Working Group, Request for Comments: 5340, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.
Farinacci et al. "Locator/ID Separation Protocol (LISP)", Internet Engineering Task Force (IETF) RFC 6830, Jan. 2013, the whole document.
Luigi Rizzo, et al.; "CHANGE: Enabling Innovation in the Internet Architecture through Flexible Flow-Processing Extensions"; Specific Targeted Research Project FP7 ICT Objective 1.1 The Network of the Future; D3.2: Flow Processing Platform Design and Early Implementation; Change Consortium 2012; Sep. 28, 2012; 109 pages.
Azfar Ayyub Qazi, et al.; SIMPLE-fying Middlebox Policy Enforcement Using SDN; SIGCOMM'13, Aug. 12-16, 2013, Hong Kong, China; 12 pages.
Glen Gibb, et al.; Outsourcing Network Functionality; *HotSDN'12*, Aug. 13, 2012, Helsinki, Finland; 6 pages.

\* cited by examiner

| Service Chaining 1 302-1 | SPID-1 304-1 | {Service Node A; Service Node B; Service Node D Service Node E} |
|---|---|---|
| Service Chaining 2 302-2 | SPID-2 304-2 | {Service Node A; Service Node B; Service Node E} |
| Service Chaining 3 302-3 | SPID-3 304-3 | {Service Node A; Service Node C; Service Node E} |

| 308-A | Service Node A/L-xTR [ESN-A] | {EID_ESN-A; RLOC_ESN-A} | 310-A |
| 308-B | Service Node B/L-xTR [ESN-B] | {EID_ESN-B; RLOC_ESN-B} | 310-B |
| 308-C | Service Node C/L-xTR [ESN-C] | {EID_ESN-E; RLOC_ESN-C} | 310-C |
| 308-D | Service Node D/L-xTR [ESN-D] | {EID_ESN-E; RLOC_ESN-D} | 310-D |
| 308-E | Service Node E/L-xTR [ESN-E] | {EID_ESN-E; RLOC_ESN-E} | 310-E |

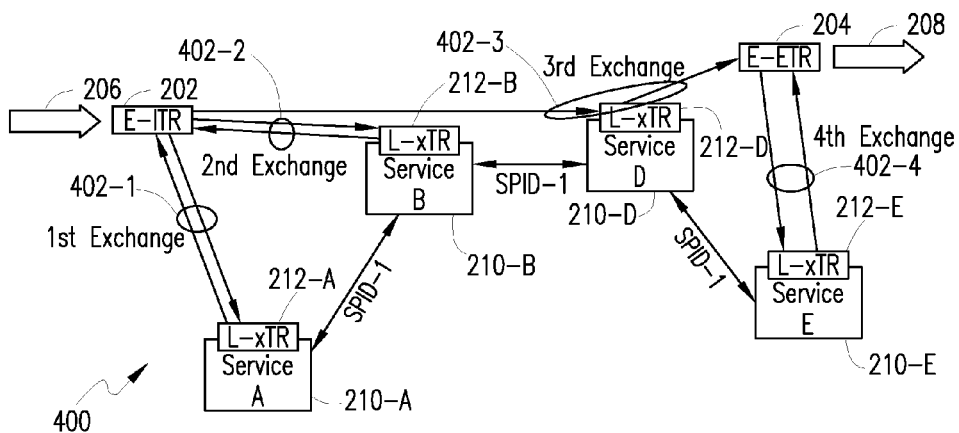

*FIG. 4*

SYSTEM AND METHOD FOR ENABLING SERVICES CHAINING IN A PROVIDER NETWORK

PRIORITY UNDER 35 U.S.C. §119(e) & 37 C.F.R. §1.78

This nonprovisional application claims priority based upon the following prior United States provisional patent application(s) entitled: (i) "ENABLING SERVICES CHAINING WITH LOCATOR/IDENTIFIER SEPARATION PROTOCOL (LISP)", Application No. 61/841,047, filed Jun. 28, 2013 in the name(s) of Wassim Haddad, Evgeny Tantsura and Joel Halpern; each of which is hereby incorporated by reference in its entirety.

CROSS-REFERENCE TO RELATED APPLICATION(S)

This application discloses subject matter that is related to the subject matter of the following U.S. patent application(s): (i) "METHOD AND APPARATUS FOR PLACING SERVICES IN A NETWORK" (Ericsson Ref. No.: P38903-US1), application Ser. No. 13/751,826, filed Jan. 28, 2013, in the name(s) of Ying Zhang and Neda Beheshti-Zavareh; (ii) "CHAINING OF INLINE SERVICES USING SOFTWARE DEFINED NETWORKING" (Ericsson Ref. No.: P37236-US2), application Ser. No. 13/556,456, filed Jul. 24, 2012, in the name(s) of Geoffrey Lefebvre, Erik Rubow and Ravi Manghirmalani; and (iii) "SERVICE PLACEMENT FOR INLINE SERVICES CHAINING WITH MULTIPLE INSTANCES" (Ericsson Ref. No.: P40960-US1), application Ser. No. 14/026,344, filed Sep. 13, 2013, in the name(s) of Ying Zhang and Neda Beheshti-Zavareh; each of which is hereby incorporated by reference herein.

FIELD OF THE DISCLOSURE

The present disclosure generally relates to the field of networks. More particularly, and not by way of any limitation, the present disclosure is directed to enabling services chaining in a provider network.

BACKGROUND

In many scenarios, data packets sent and/or received by end-users need to be processed by multiple services running in the service provider (SP) infrastructure. The mechanism that allows the flow of data packets to be processed by a pre-selected set of service(s) is referred to as service or services chaining. For example, data packets sent/received by a client (X) may need to be processed first by a Deep Packet Inspection (DPI) application then examined by another service in charge of parental control or policy, and followed by Network Address Translation (NAT) before exiting the SP network. In such a scenario, it is necessary that data packets be processed in a sequential order by the three different services.

Accordingly, services chaining may be required if the traffic needs to go through more than one inline service. Moreover, if more than one chain of services is possible, the operator needs to configure the networking infrastructure to direct the right traffic through the right inline service path.

SUMMARY

The present patent disclosure is broadly directed to a scheme for enabling services chaining in a service provider network. The example embodiments involve a flexible map and encapsulation mechanism that facilitates sequential data exchange transactions with one or more services to ensure that the data packets of a subscriber flow are steered to the required services in accordance with the service chaining policy applied or otherwise assigned to the flow.

In one aspect, an embodiment of a method of chaining services for a data packet flow in a service provider network is disclosed. The claimed embodiment comprises, inter alia, determining a service chaining policy associated with the data packet flow and determining a Service Path Identifier (SPID) associated with the service chaining policy. If the service chaining policy involves one or more service nodes to be traversed by the data packet flow for obtaining services in a sequential order, a determination is made for obtaining Endpoint Identifiers (EIDs) and Routing Locators (RLOCs) of the one or more service nodes using the SPID of the service chaining policy. Thereafter, a data exchange process is performed with the one or more service nodes using encapsulation of data packets based on the EIDs and RLOCs of the service nodes to sequentially route the data packet flow to each of the service nodes.

In another aspect, an embodiment of a network node configured to operate as an ingress/egress node of a service provider network is disclosed. The claimed embodiment comprises one or more processors and a persistent memory module having instructions configured to perform an embodiment of a services chaining method described hereinabove when executed by the processors. In a still further aspect, an embodiment of a non-transitory computer-readable medium containing instructions stored thereon is disclosed for performing one or more embodiments of the methods set forth above.

In yet another aspect, an embodiment of a service node operable with a service provider network is disclosed. The claimed embodiment comprises one or more processors and a persistent memory coupled thereto, wherein the persistent memory is configured to include instructions for executing the following acts: process a double-encapsulated data packet received from one of an ingress node and an egress node of the service provider network, the processing comprising removing an EID encapsulation and an RLOC encapsulation from the double-encapsulated data packet; forward the data packet to a service logic module configured to deliver a service; and re-encapsulate the data packet, upon delivery of service by the service logic module, and send the re-encapsulated data packet to one of the ingress node and the egress node based on optimizing a next service hop required in accordance with the service chaining policy.

Advantages of the present invention include, but not limited to, providing a highly flexible chaining of services within a service provider network pursuant to one or more service chaining policies. Because default service locations can be changed dynamically, and the embodiments of the present invention can be agnostic as to where the services are placed, service network operators can bring more services online without negatively impacting scalability. Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 3A and 3B depict example database structures relative to one or more embodiments of services chaining in the example network of FIG. 2;

FIG. 4 depicts an example sequential or oscillating data exchange mechanism for effectuating a services chaining mechanism in the example network of FIG. 2 according to an embodiment;

DETAILED DESCRIPTION OF THE DRAWINGS

Figure 1:
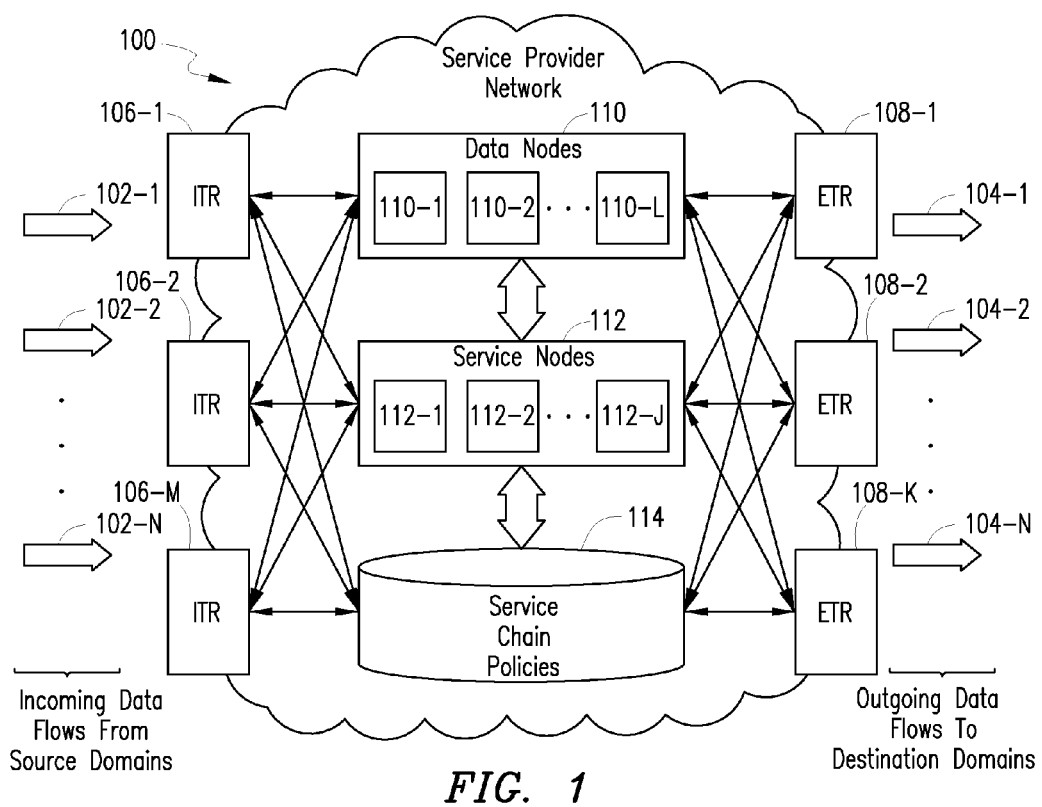
FIG. 1 depicts an example network wherein one or more embodiments of the present patent disclosure may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that one or more embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node (e.g., a router, switch, bridge, etc.) is a piece of networking equipment, including hardware and software that communicatively interconnects other equipment on a network (e.g., other network elements, end stations, etc.). Some network elements may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) may access or consume content/services provided over a packet-switched wide area public network such as the Internet via suitable service provider access networks. Subscriber end stations may also access or consume content/services provided on virtual private networks (VPNs) overlaid on (e.g., tunneled through) the Internet. Regardless of the specific implementation, it should be appreciated that one or more embodiments of the present patent disclosure may involve a service provider network having a plurality of network nodes (e.g., switches interconnected in a topological arrangement) wherein one or more services are disposed for traversal by a plurality of subscriber data flows (generated by or involving any type of above-described subscriber end stations) according to known or otherwise preconfigured service requirements (i.e., services chaining policies).

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices (e.g., an end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device may be configured to store code and/or data for execution on one or more processors of that electronic device for purposes of implementing one or more techniques of the present disclosure.

Taking particular reference to FIG. 1, depicted therein is an example service provider network 100 including one or more ingress nodes 106-1 to 106-M (also referred to as Ingress Tunnel Routers or ITRs) and one or more egress nodes 108-1 to 108-K (also referred to as Egress Tunnel Routers or ETRs), wherein one or more embodiments of the present patent disclosure may be practiced for purposes of enabling services chaining within the network. Reference numerals 110-1 to 110-L refer to a plurality of data switching/forwarding nodes or routers coupled together in a topological configuration for effectuating routing of incoming data packet flows 102-1 to 102-N received from source domains at the ingress nodes 106-1 to 106-M to the egress nodes 108-1 to 108-K that emit outgoing data packet flows 104-1 to 104-N to external or destination domains. It should be appreciated that the routing of data packets within the network 100 may be effectuated using any known class of routing protocols between any two nodes in the network, such as, e.g., a link-state routing protocol or a distance-vector routing protocol. Reference numerals 112-1 to 112-J refer to one or more inline services that are placed within the network 100 relative to the data nodes which the incoming subscriber data flows 102-1 to 102-N may be required to traverse in a sequential order based on subscriber and/or operator policies, service chaining requirements, and the like, which may be provided as one or more distributed or centralized databases 114 associated with the network 100. By way of example, such services may comprise Deep Packet Inspection (DPI), Virus Scanning (VS), Intrusion Detection and Prevention (IDP), Firewall (FW) filtering, Network Address Translation (NAT), and the like. Further, one or more of such inline services may be provided in multiple instances or replicas, which may be deployed by the network operator for load-balancing, for example.

As the ITR and ETR nodes are placed at the perimeter of the network 100, they may be commonly referred to as perimeter nodes or switches, with a generic designation of "xTR". An incoming data packet flow at an ITR node may be routed internally within the network 100, traversing one or more services in a particular order as may be required pursuant to a services policy. Accordingly, associated with each incoming data packet flow, a service path may be defined or otherwise determined that delineates the following: the flow's entry point to the network, an ordered sequence of one or more services (or, service nodes), and followed by an exit point. It should be recognized that not all data packet flows may require services and, therefore, a service policy for such flows may simply comprise an empty set for the ordered sequence of services (i.e., a null set). Further, the concept of a data packet flow can be defined broadly, e.g., a Transmission Control Protocol (TCP) connection, or all traffic from a particular Media Access Control (MAC) address or Internet Protocol (IP) address, or all packets with the same Virtual LAN (VLAN) tag, or all packets from the same switch port, or all traffic having one or more user-defined control flags, as well as including any combination of the foregoing conditionalities.

To effectuate a flexible services chaining scheme in a scalable network architecture, the embodiments of the present patent disclosure advantageously employ an IP routing and addressing protocol architecture wherein the IP address space is separated into two different spaces in order to decouple the locator and identifier functionalities of the numbering assigned to a group of network devices (i.e., locator/identifier or "Loc/ID" separation). The basic idea behind such Loc/ID separation is that the current IP addressing architecture which combines two functions, a routing location function (also referred to as Routing Locator or RLOC, describing how a device is attached to the network) and an endpoint identification function (also referred to as Endpoint Identifier or EID, defining "who" the device is), in a single numbering space, is inadequate and inefficient for implementing a scalable system without unacceptable performance constraints. By creating two separate namespaces, i.e., an EID namespace containing IP addresses assigned to end hosts and an RLOC namespace containing IP addresses assigned to routers, several advantages may be achieved, e.g., improved routing scalability by using topologically-aggregated RLOCs, provider-independence for devices numbered out of the EID space (IP portability), multi-homing of end-sites with improved traffic engineering, IPv6 transition functionality, IP mobility (i.e., EIDs can move without changing while only the RLOC changes), among others.

It should be appreciated that Loc/ID separation technologies can be implemented either in the network infrastructure or in the host itself. Examples of host-based separation technologies comprise ILNP (Identifier-Locator Network Protocol), HIP (Host Identity Protocol), SHIM6 (Site Multi-Homing by IPv6 Implementation), etc. An example of network-infrastructure-based separation technology is LISP or Locator/Identifier Separation Protocol, which is a "map-and-encapsulate" protocol standardized according to RFC 6830 specification, incorporated by reference herein.

Figure 2:
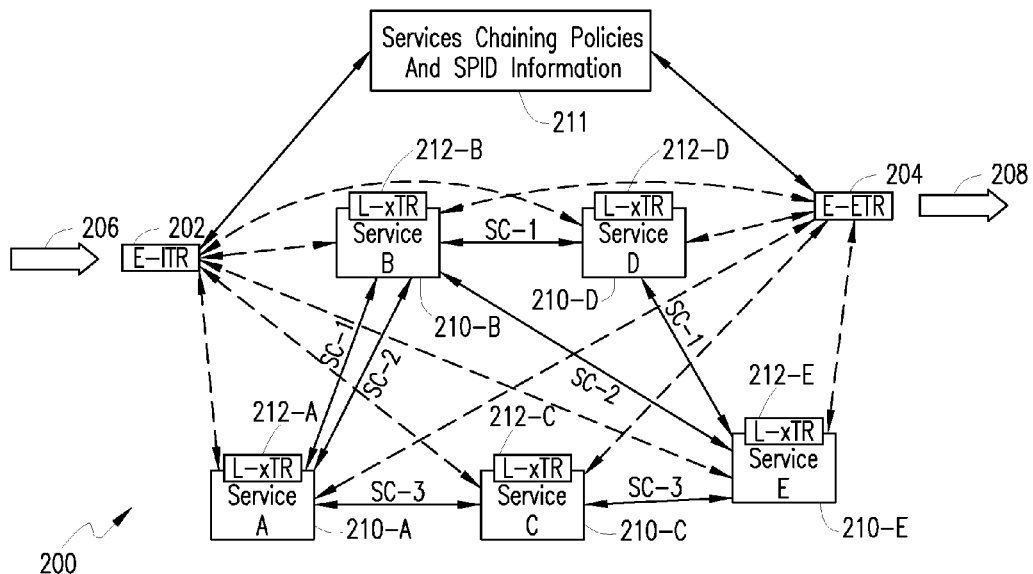
FIG. 2 depicts an additional example network wherein one or more embodiments of the present patent disclosure may be practiced.

FIG. 2 depicts an example network 200 wherein a "map-and-encapsulate" methodology is implemented for effectuating one or more embodiments of the present patent disclosure. For the sake of simplicity, the example network 200 is illustrated with five service nodes Service A 210-A to Service E 210-E disposed between an ingress node 202 (operative to receive an incoming flow 206) and an egress node 204 (operative to emit an outgoing flow 208). A services chaining policy database 211 may be deployed in association with a management node such as an Authentication, Authorization and Accounting (AAA) node that is accessible to both ingress and egress nodes 202, 204. To facilitate an adaptable or configurable services chaining mechanism with respect to the incoming data flows, a sub-space within the EID address space associated with the network is used for identifying various service chaining paths pursuant to the applicable chaining policies. For purposes of the teachings of the present patent disclosure, the EID sub-space used for identifying the service chaining paths will be referred to as a "Services Path Identifier" (SPID) space. By way of illustration, three services chaining policies involving one or more service nodes are exemplified: SC-1 involving the ordered sequence of Service A 210-A, Service B 210-B, Service D 210-D and Service E 210-E; SC-2 involving the ordered sequence of Service A 210-A, Service B 210-B and Service E 210-E; and finally, SC-3 involving the ordered sequence of Service A 210-A, Service C 210-C and Service E 210-E.

In accordance with the teachings of the present patent disclosure, both ingress and egress nodes 202, 204 are provided with the functionality to allow specific data flows to be processed by each service identified in the corresponding services chaining policy in a sequential execution that may be shared by the ingress/egress nodes in an oscillatory or "ping-pong" fashion depending on relative location of the service nodes. The functionality added to the ingress/egress nodes to effectuate such a process, which will be described in further detail hereinbelow, may be referred to as "evolved routing functionality" and the ingress/egress nodes may accordingly be referred to as "E-ITR" or "E-ETR" nodes, respectively, or as "E-xTR" nodes more generically. In addition to the "evolved xTR" functionality of the end hosts, each service node is also provided a "lightweight" functionality for encapsulating processed data packets (i.e., serviced data packets) and forwarding the encapsulated data packets to the nearest E-xTR. The lightweight functionality added to the service nodes may be referred to as "L-xTR" functionality, consistent with the terminology used for the evolved end hosts of the network 200. As illustrated in FIG. 2, each service node is exemplified with a respective L-xTR block 212-A through 212-E, and the terms "evolved service node" or "enhanced service node" (i.e., ESN) and "service node" may be used somewhat interchangeably hereinafter for purposes of the present patent disclosure and may include the L-xTR functionality either separately or otherwise.

It should be appreciated that by keeping most of the intelligence needed for flexible services chaining in the two evolved end hosts/nodes, i.e., E-ITR 202 and E-ETR 204, located on the periphery of the network 200, a more robust and highly scalable architecture may be achieved wherein the service nodes can remain relatively less complex. In general operation, when an E-ITR node receives a particular data traffic flow, it obtains or otherwise determines the services chaining policy associated the traffic flow and initiates services processing, node by node, by steering the data packets to the service nodes or locations in the specific order identified in the services chaining policy. As will be seen below, the data packet steering process for ensuring that each required service node is visited may be shared by both E-ITR and E-ETR nodes, which culminates in all packets of the particular flow serviced at the requisite service nodes and exiting from the E-ETR node.

To further concretize the example embodiments, reference is now taken to FIG. 3A, wherein a database structure 300A is illustrative of a SPID space that identifies three example service paths described above. Reference numeral 304-1 refers to a path identifier SPID-1 (in IPv4 or IPv6) that corresponds to SC-1 302-1 comprising four services: Service A 210-A, Service B 210-B, Service D 210-D and Service E 210-E. As set forth above, each of the service nodes is comprised of appropriate service logic to execute the required service as well as the Lx-TR functionality. Likewise, SPID-2 304-2 and SPID-3 304-3 identify SC-2 302-2 and SC-3 302-3, respectively, each comprising a corresponding ordered sequence of services. Turning to FIG. 3B, depicted therein is a database structure 300B wherein each evolved/enhanced service node (ESN) is assigned an EID address and an RLOC address that may be used by the E-xTR nodes for encapsulating data packets for purposes of steering to the appropriate ESNs. By way of illustration, reference numerals 308-A to 308-E refer to the five ESNs shown in FIG. 2, whereas reference numerals 310-A to 310-E refer to five pairs of EIDs and RLOCs corresponding to the five ESNs. In one implementation, database structures 300A and/or 300B may be provisioned in a management node such as node 211 (shown in FIG. 2) that is accessible to the E-xTR nodes. In another implementation, the SPID and EID/RLOC information may be stored at or otherwise provided to the E-xTRs. Regardless of the specific implementation, it should be understood that E-xTR nodes have the same overall view of the network topology disposed therebetween and may be configured with the same SPID and EID/RLOC information.

FIG. 4 depicts an example sequential or oscillating data exchange mechanism 400 that involves mapping and encapsulation for effectuating a services chaining mechanism in the example network of FIG. 2 according to an embodiment. By way of illustration, data packet flow 206 is steered according to the service chaining policy SC-1 that is identified by SPID-1. Because SC-1 involves the path that traverses four services, i.e., Service A 210-A, Service B 210-B, Service D 210-D and Service E 210-E, four corresponding data exchange transactions are exemplified in FIG. 4. In general, the first data exchange transaction of an example oscillating data exchange mechanism may be initiated by the ingress E-ITR node that involves the first service node of a service path associated with an incoming packet flow. In analogous fashion, the final data exchange transaction may be terminated at the egress E-ETR node that involves the final service node of the service path. If there are additional or intermediary service nodes that need to traversed, some of the data exchange transactions concerning such intermediary nodes may involve both E-xTR nodes depending on the service nodes' topological location relative to the E-xTR nodes. Accordingly, in some implementations, if the final service node in a services chain happens to be more proximal to an ingress E-ITR node, the serviced data packets may be sent to the ingress E-ITR node which then forwards the packets to the egress E-ETR node for subsequent outgoing transmission.

With respect to the traversal of data packet flow 206, reference numeral 402-1 refers to the first data exchange transaction between E-ITR 202 and service node ESN-A 210-A/212-A. Likewise, a second data exchange transaction 402-2 involves E-ITR 202 and service node ESN-B 210-B/212-B, a third data exchange transaction 402-3 involves both E-xTR nodes 202, 204 and service node ESN-D 210-D/212-D, and the final or fourth data exchange transaction 402-4 involves E-ETR node 204 and service node ESN-E 210-E/212-E.

Broadly, the example sequential/oscillatory data exchange process 400 involving the foregoing data exchange transactions may be executed as follows. When an E-ITR node obtain the services chaining policy associated with a particular incoming data traffic flow, it determines the corresponding SPID and performs a lookup/query to fetch the set of associated EIDs/RLOCs corresponding to the service nodes of the service path identified by the SPID. After fetching/obtaining the first RLOC, the E-ITR encapsulates incoming data packet with a first header carrying EIDs reflecting servicing node's L-xTR and the overall service chaining path. For example, with respect to Service Node A (i.e., ESN-A or Service(A)), E-ITR 202 is operative to append an EID header that is configured to carry EID_L-xTR_Service(A) as a destination(EID) and SPID-1 as source (EID) (EID encapsulation process). After appending the EID source/destination headers, E-ITR 202 appends another header pair for carrying the RLOCs (RLOC encapsulation process), wherein the source RLOC field is operative to carry the E-ITR RLOC and the destination RLOC field is operative to carry the L-xTR_Service(A)'s RLOC for transmission to ESN-A as part of the first data exchange transaction 402-1.

Upon receiving the encapsulated packet, ESN-A's L-xTR functionality stores the binding between IP addresses and EIDs in its cache and then removes the two appended headers and forwards the packet to the service logic entity. After delivering the service, ESN-A's L-xTR functionality appends the EID header stored in its cache but with inverting the EID source and destination (i.e., source(EID)=EID_L- xTR_Service(A) and destination(EID)=SPID-1) and a destination RLOC header which may be preconfigured. In one implementation, the destination(RLOC) can be either E-ITR's RLOC or E-ETR's RLOC depending on the topological location of the L-xTR. In the illustrative example of FIG. 4, it is shown that ESN-A is disposed closer to E-ITR 202 rather than E-ETR 204. Accordingly, it may be determined that sending the data packet back to E-ITR 202 is more optimal than sending it to E-ETR 204. Thus, in the example sequential/oscillatory data exchange process 400, Service(A)_LxTR is operative to send the data packets back to E-ITR 202.

After receiving data packets from ESN-A, E-ITR 202 determines or is otherwise aware that the next hop in SPID-1 is ESN-B (i.e., Service(B) or Service-B with the associated L-xTR functionality). Therefore, E-ITR 202 re-encapsulates the data packet with parameters associated with Service(B)_LxTR and forwards the packet to its destination as part of the second data exchange transaction 402-2. Based on the illustrative network topology shown in FIG. 4, ESN-B node may decide to forward the packets back to E-ITR 202 or E-ETR 204 (e.g., depending on the proximity of ESN-B to E-ETR 202). In another variation, depending on the network topology intelligence of the ESN, an ESN may send the data packets to the E-xTR node that is closer to the next service rather than itself. In the illustrative network topology of FIG. 4, the data packets are returned from ESN-B to E-ITR 202 which would then forward it to ESN-D (i.e., Service(D) or Service-D with associated L-xTR, according to the service path identified by SPID-1), as part of the third data exchange transaction 402-3. After delivering the service, ESN-D's L-xTR appends the EID header which is configured to carry the SPID data and an RLOC header which points to E-ETR's RLOC as destination(RLOC) (because of the proximity thereto). It should be noted that that depending on the network topology, it is possible in some implementations for the E-ITR node to send the packets to the E-ETR node before forwarding the packets to the next service node of a services chaining path.

Upon receiving the data packet from ESN-D, E-ETR 204 is operative to determine which services have been already visited and which one(s) is/are still remaining to be visited in order to complete the designated services chaining path identified by SPID-1. One skilled in the art will recognize that in the embodiment set forth above the ability to determine the remaining service(s) is dependent on the SPID parameter and the origin of the packets. Consequently, E-ETR 204 determines that the next service hop with respect to SPID-1 is ESN-E and encapsulates the data packets similar to the E-ITR encapsulations described above for transmission to ESN-E (as part of the final data exchange transaction 402-4). After delivering the service, Service(E)_LxTR forwards the data packets back to E-ETR 204, which then decapsulates the headers and forwards the packets to the destination domain (e.g., Internet) as the outgoing flow 208.

It should be appreciated that if all services of a service chain are stacked at a single service node, the foregoing mechanism provides that there would be no more bouncing on the E-xTR nodes. In other words, multiple data exchange transactions involving E-ITR 202, for example, can be compressed into one transaction with the stacked service node before the data packets are handed off to E-ETR 204 for subsequent transmission.

Figure 5:
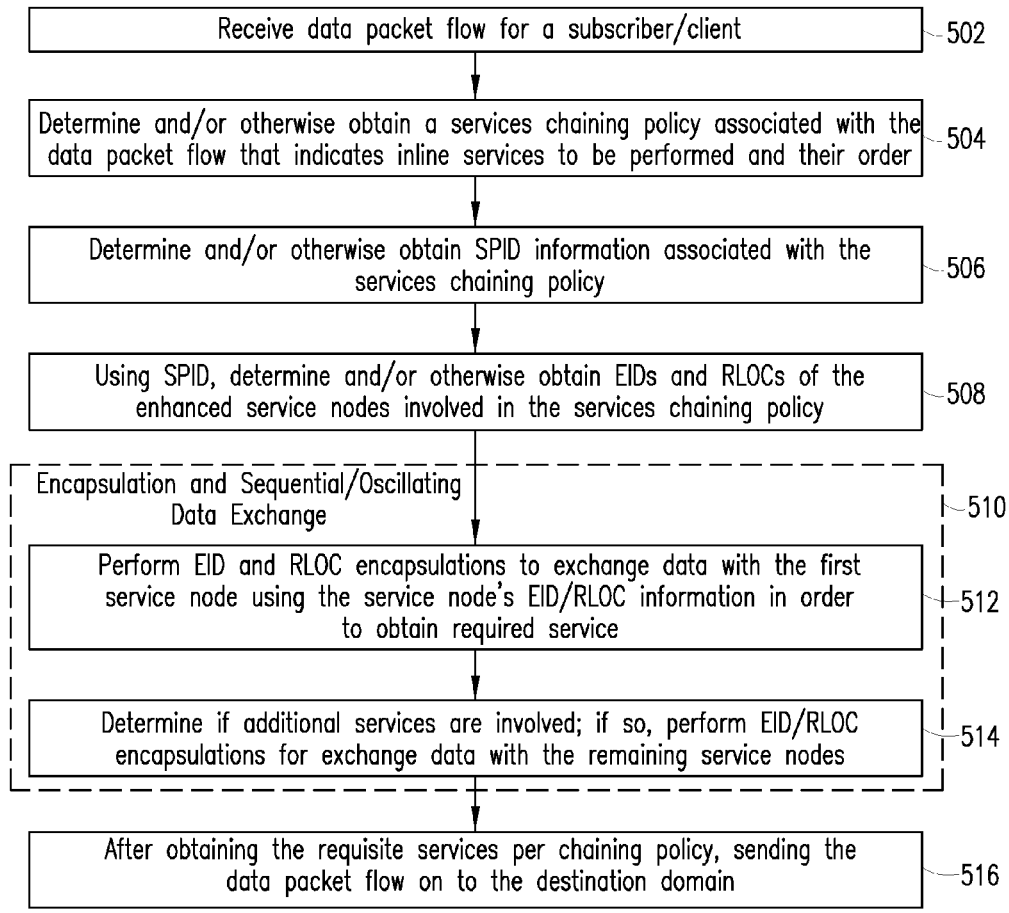
FIGS. 5 and 6A-6B depict flowcharts pertaining to sequences of events that may occur according to an embodiment of a services chaining mechanism of the present patent disclosure.
Figure 6A:
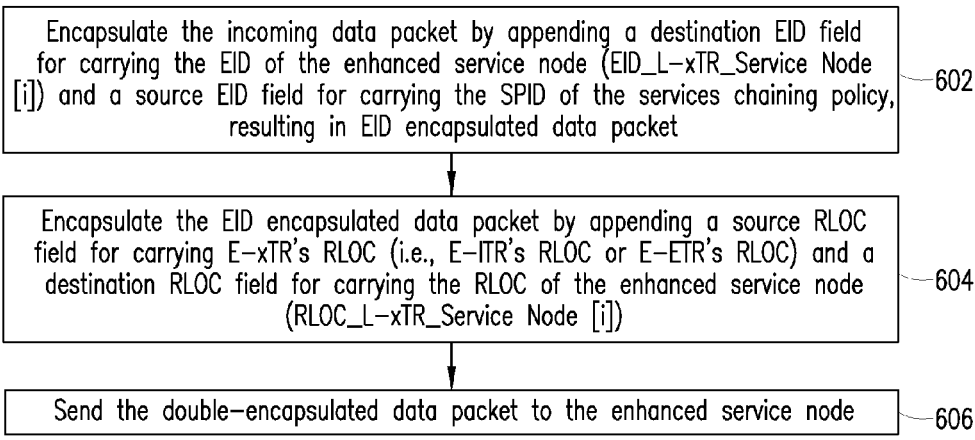
Figure 6B:
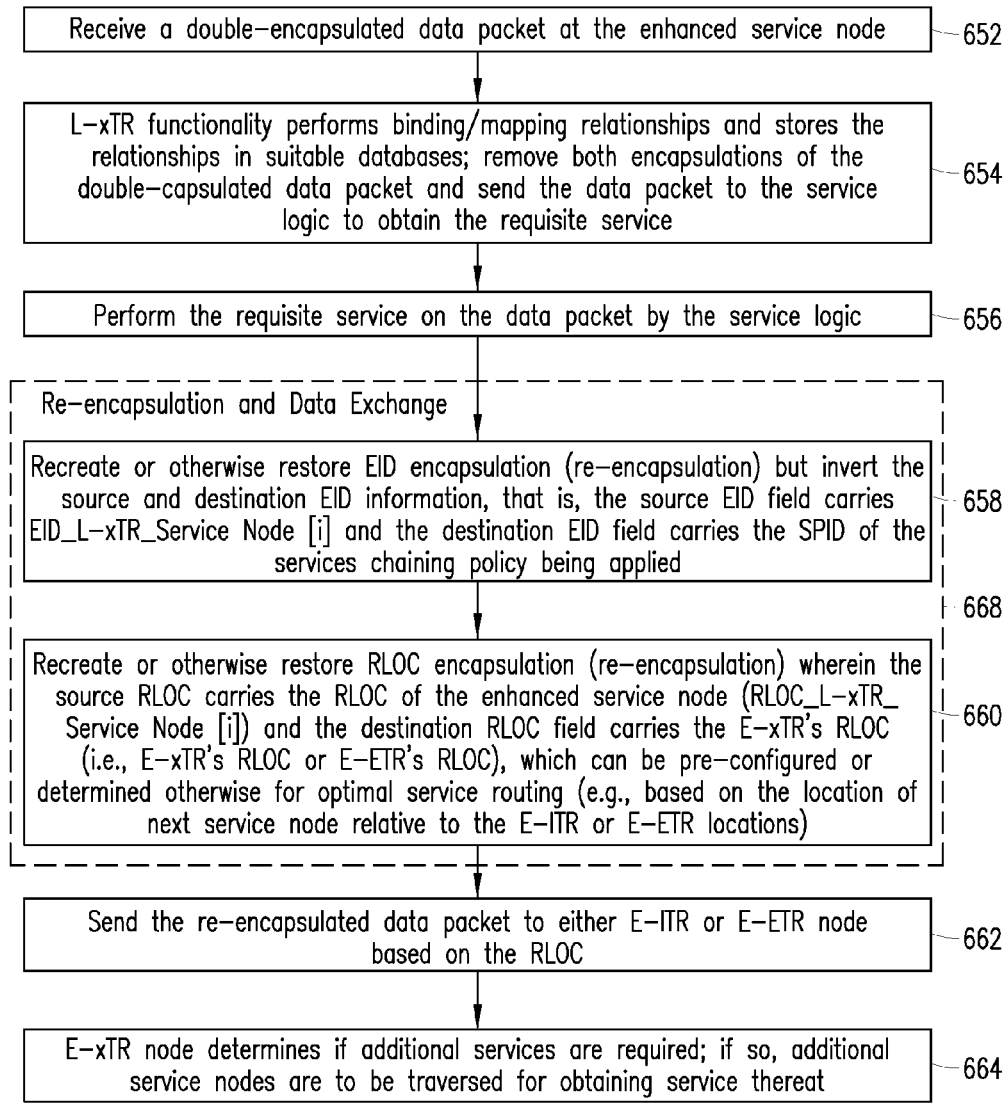

FIGS. 5 and 6A-6B depict flowcharts pertaining to sequences of events that may occur according to an embodiment of a services chaining mechanism exemplified in the foregoing description. Reference numeral 500 generally refers to an overall services chaining mechanism that may be implemented with respect to a service provider network. At block 502, an ingress node of a service provider network receives a subscriber/client data packet flow. At block 504, a services chaining policy associated with the data packet flow may be determined and/or otherwise obtained. At block 506, a SPID parameter associated with the services chaining policy may be determined and/or otherwise obtained. Thereafter, if the services chaining policy involves one or more service nodes to be traversed by the data packet flow, appropriate EID/RLOC information associated with the one or more service nodes may be determined and/or otherwise obtained based on the SPID parameter (block 508). As set forth previously, services chaining policies, SPID data and EID/RLOC data associated with the service nodes may be provisioned in one or more databases associated with a centralized management node or at the peripheral nodes (i.e., E-xTR nodes). Accordingly, the determinations set forth at blocks 504-508 may involve table lookups, database queries, request/response transactions and other mechanisms. Based on the EIDs and RLOCs of the service nodes, a data exchange process may be performed sequentially using encapsulation of the data packets, wherein the exchange process may be oscillated between the ingress and egress nodes (block 510). In one implementation, the sequential data exchange process 510 may involve performing EID and RLOC encapsulations (i.e., a double encapsulation process, each encapsulation involving a source field and a destination field) of data packets with respect to a service node and determining if additional services are to be performed, as set forth at blocks 512, 514. After obtaining the requisite services (as per the services chaining policy), the data packet flow is then transmitted to a destination domain (block 516).

Turning to FIG. 6A, reference numeral 600A generally refers to an example double encapsulation process illustrated in further detail. At block 602, a data packet is encapsulated by appending a destination EID field for carrying the EID of the enhanced or evolved service node (EID_L-xTR_Service Node [i]) and a source EID field for carrying the SPID of the services chaining policy, resulting in an EID encapsulated data packet. At block 604, the EID encapsulated data packet is encapsulated again by appending a source RLOC field for carrying E-xTR's RLOC (i.e., E-ITR's RLOC or E-ETR's RLOC) and a destination RLOC field for carrying the RLOC of the enhanced service node (RLOC_L-xTR_Service Node [i]). After the EID encapsulation followed by the RLOC encapsulation, the double-encapsulated data packet is transmitted to the enhanced service node (Service Node [i]) (block 606).

FIG. 6B illustrates a process flow 600B comprising various blocks that correspond to the acts and functions at an evolved service node. At block 652, the evolved service node receives a double-encapsulated data packet from one of the E-xTR nodes as set forth above. At block 654, the L-xTR functionality associated with the service node is operative to perform IP address binding/mapping relationships, which may be stored in a suitable database (e.g., a local cache). The L-xTR functionality is also configured to remove both EID/RLOC encapsulations (i.e., decapsulation) of the double-capsulated data packet and send the data packet to a service logic module or entity to obtain the requisite service. Appropriate service logic is thereafter executed for performing the requisite service on the data packet (block 656). As alluded to previously, such services may comprise one or more DPI services, VS services, IDP services, FW filtering services, NAT services, parental control services, and the like. After servicing, a re-encapsulation process 668 is effectuated by the service node which involves the following: recreate or otherwise restore EID encapsulation (re-encapsulation) but invert the source and destination EID information, that is, the source EID field carries EID_L-xTR_Service Node [i] and the destination EID field carries the SPID of the services chaining policy being applied (block 658); and recreate or otherwise restore RLOC encapsulation (re-encapsulation) wherein the source RLOC carries the RLOC of the enhanced service node (RLOC_L-xTR_Service Node [i]) and the destination RLOC field carries the E-xTR's RLOC (i.e., E-ITR's RLOC or E-ETR's RLOC), which can be pre-configured or determined otherwise for optimal service routing (e.g., based on the location of next service node relative to the E-ITR or E-ETR locations) (block 660). Thereafter, the re-encapsulated data packet is transmitted to either E-ITR or E-ETR node based on the RLOC (block 662), which then determines if additional services are required. If so, the additional service nodes are traversed according to the sequential order specified in the services chaining policy, using the double-encapsulation and re-encapsulation processes set forth above (block 664).

Figure 7:
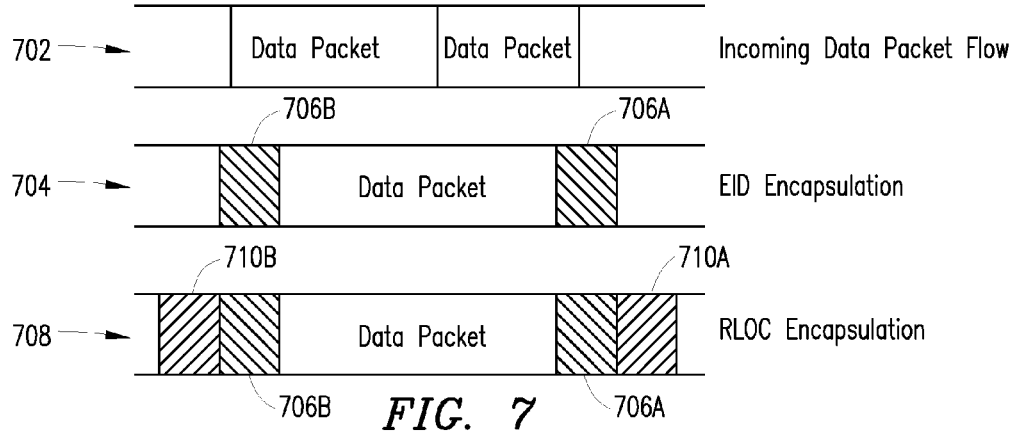
FIG. 7 depicts an illustrative example of data packet encapsulation and re-encapsulation for effectuating a services chaining mechanism according to an embodiment.

FIG. 7 depicts an illustrative example of data packet encapsulation for effectuating a services chaining mechanism according to an embodiment. Reference numeral 702 generally refers to an incoming data packet flow having a plurality of data packets. Reference numeral 704 generally refers to an EID encapsulated data packet wherein an EID source field 706A and an EID destination field 706B are exemplified. As described in detail hereinabove, the EID source field 706A may be populated with the SPID parameter associated with a particular services chaining policy applied to the data packet flow 702. In similar fashion, the EID destination field 706B may be populated with the EID of the service node to which the data packet is to be steered. Reference numeral 708 generally refers to an RLOC encapsulation subsequent to the EID encapsulation of the data packet, wherein an RLOC source field 710A and an RLOC destination field 710B are exemplified. Similar to the EID encapsulations, the RLOC source field 710A may be populated with the RLOC of the sending E-xTR node and the RLOC destination field 710B may be populated with the RLOC of the service node to which the data packet is to be steered.

Figure 8:
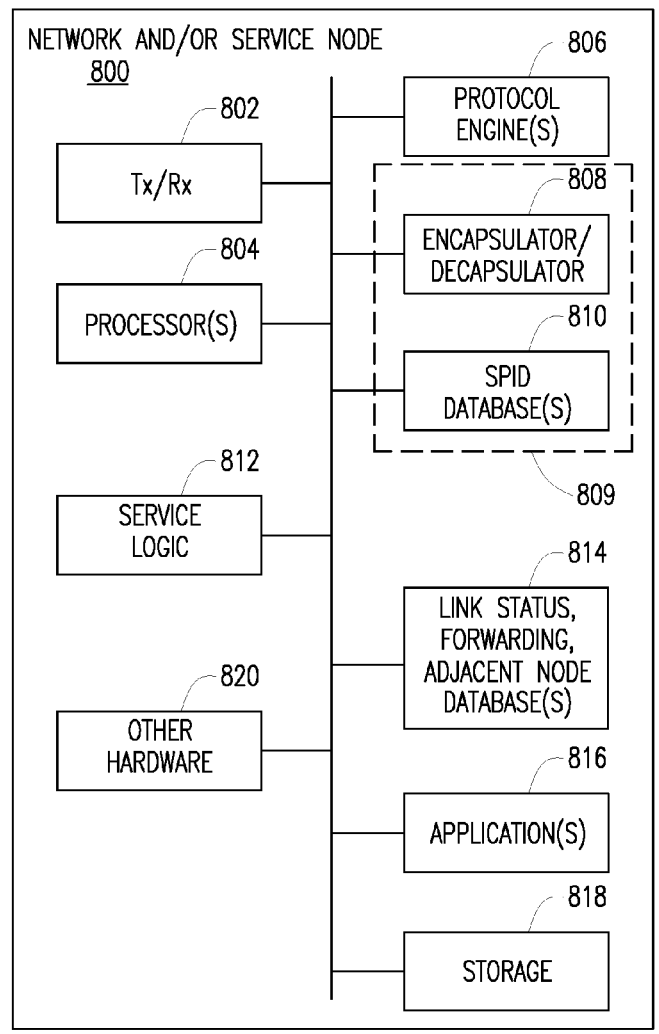
FIG. 8 depicts a block diagram of a network node that may be configured to implement a services chaining mechanism according to an embodiment of the present patent disclosure.

FIG. 8 depicts a block diagram of a node 800 that may be configured to implement a services chaining mechanism according to an embodiment of the present patent disclosure. It should be appreciated that node 800 may be implemented as an exemplary computer system that is representative of an E-xTR node or an ESN node depending on the functionalities set forth in detail in the present patent disclosure. For example, node 800 may be configured to execute at least a portion of the blocks of FIG. 5 or 6A for operation as an E-xTR node. Likewise, node 800 may be configured to execute at least a portion of the blocks of FIG. 6B for operation as an ESN. One or more processors 804 are operative to control a plurality of subsystems (implemented in hardware, software, firmware and/or in any combination thereof) that may be interconnected using suitable bus architecture. A Tx/Rx interface module 802 is operative to effectuate various types of network connectivity with respect to a service provider network, including but not limited to connectivity internal to the service provider network as well as external connectivity. One or more protocol engines 806 are operative to effectuate appropriate communications protocols based on how a service provider network may be architected. Volatile storage 818 may comprise various types of random access memory (RAM) for providing temporary storage of data or information. Nonvolatile storage 809 is illustrative of persistent storage, e.g., read-only memory (ROM) circuits, erasable programmable read-only memory (EPROM) circuits, Flash memory circuits, as well as external memory cards, and the like. In one implementation, persistent memory 809 may include a database or cache 810 for storing SPID data, EID/RLOC data of the service nodes as well as applicable service chaining policies. In addition, persistent memory 809 may be configured to include program instructions consolidated as one or more modules 808 executable by one or more processors 804 for effectuating mapping/encapsulation/re-encapsulation/decapsulation processes set forth above. Where implemented as an ESN, node 800 may also include appropriate service logic 812 for delivering one or more services with respect the traffic steered thereto. Additional databases relative to routing such as, e.g., link status, forwarding tables, adjacencies, etc. are illustrated as one or more databases 814. One or more applications 816 may also be provided as part of the node 800 for effectuating network-level functionalities specific to a service provider. Other hardware 820 may include one or more user input/output devices (e.g., display screens, pointing devices, etc.), command interfaces, bus controllers, memory controllers, power supply circuitry, and the like.

Based upon the foregoing Detailed Description, it should be appreciated that embodiments of the present disclosure provide a novel and nonobvious methodology for steering data flows in strict accordance with respective services chaining policies implemented within a service provider network. As service deployment in virtualized environments and/or cloud-based platforms becomes more prevalent, the flexibility of moving services and service instances to more optimal or otherwise more suitable locations within the network assumes particular significance. Regardless of where the services are placed, the embodiments disclosed herein effectuate a flexible services chaining mechanism which ensures that all incoming data packets visit the required services in correct order, even as service network operators may move the existing services around and/or bring more services online. It should be noted that the use of a mapping and encapsulation based solution of the present disclosure allows deployment of other advanced features of the service provider infrastructure such as, e.g., mobility, multi-homing, virtual machine (VM) migration and Layer-3 identification. Further, because the mapping/encapsulation based solution brackets the services chaining space, there is little impact on the larger operator environment.

In some variations of the example embodiments, it should be noted that the E-xTR node may not need to explicitly append an EID header to the data packets. However, in such cases, the E-xTR node may be configured to store the EID parameters in its cache together with parameters it has received from a management node (e.g., the AAA server). This is needed in order to enable the E-xTR node to determine the correct associated services chaining path (since one servicing node may belong to multiple services chaining paths). It should be appreciated that the main reason to explicitly attach an EID header is to avoid having E-xTR dig deep in each data packet in order to be able to lookup the SPID and determine the next hop in the service chain.

Those skilled in the art will further recognize that the example embodiments are fully deployable even where end hosts use (overlapping) IPv4 addresses. Multiple E-xTRs can be deployed around the servicing nodes for different purposes, e.g., especially if services are not in the same domain or spread within different cloud domains. E-xTRs involved in enabling services chaining may be configured to keep their databases synchronized using existing mechanisms like NERD (Not-so-novel EID RLOC Database), LISP+ALT, etc. For example, Border Gateway Protocol (BGP) may be configured to announce to each E-xTR where the mappings can be found.

An additional approach to optimize different aspects of the present patent disclosure may involve adding more information about the targeted path in each data packet header. The main advantage would be to avoid the "ping-pong" effect between E-xTR(s) and each L-xTR, thereby enabling data packets to visit the entire chain without having to bounce back on the E-xTR(s). In such a scenario, each data packet may be injected by an E-xTR node into the selected services chain, whereupon it is forwarded by each servicing node to the next node until it exits the chain. Such forwarding capability may be obtained by, for example, inserting into the header the entire set of RLOCs corresponding to each L-xTR involved in the services chain. In another variation, the forwarding capability may be obtained by inserting the SPID parameter only and allowing each node do a map lookup in order to ascertain the next service hop. It should be appreciated that an ingress node (i.e., E-ITR node) may be configured to perform such insertions.

Although the example embodiments of the present patent disclosure have been described in detail by taking reference to a Loc/ID separation architecture based on LISP, it should be appreciated that the teachings herein may be practiced in conjunction with other network architectures as well. e.g., as a Software-Defined Network (SDN). For instance, such SDN implementations may be based on known protocols such as, e.g., OpenFlow protocol or Forwarding and Control Element Separation (ForCES) protocol, etc.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated and blocks from different flowcharts may be combined, rearranged, and/or reconfigured into additional flowcharts in any combination or subcombination. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, module, element, step, act, or function is essential such that it must be included in the scope of the claims. Reference to an element in the singular is not intended to mean "one and only one" unless explicitly so stated, but rather "one or more" or "at least one". All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method of chaining services for a data packet flow in a service provider network, the method comprising:
   determining a service chaining policy associated with the data packet flow;
   determining a Service Path Identifier (SPID) associated with the service chaining policy;
   if the service chaining policy involves two or more service nodes to be traversed by the data packet flow for obtaining services in a sequential order, determining Endpoint Identifiers (EIDs) and Routing Locators (RLOCs) of the two or more service nodes using the SPID of the service chaining policy; and
   performing a data exchange process with the two or more service nodes using encapsulation of data packets based on the EIDs and RLOCs of the service nodes to route the data packet flow to each of the two or more service nodes according to the service chaining policy, wherein the data exchange process is initiated by an ingress node that receives the data packet flow and oscillates between the ingress node and an egress node that emits the data packet flow after obtaining services at the two or more service nodes, based on locations of the two or more service nodes relative to the ingress and egress nodes of the service provider network, and further wherein each of the two or more service nodes returns serviced data packets of the data packet flow to a nearest one of the ingress and egress nodes after providing a service to the data packet flow, the ingress and egress nodes operating to steer the returned serviced data packets to a next service node of the service chain policy.

2. The method as recited in claim 1, wherein the data exchange process further comprises:
   encapsulating an incoming data packet by appending (i) a destination EID field having the EID of a service node that must be traversed for obtaining a service thereat and (ii) a source EID field having the SPID of the service chaining policy, resulting in an EID-encapsulated data packet;
   encapsulating the EID-encapsulated data packet by appending (i) a source RLOC field having an RLOC of one of the ingress node and the egress node and (ii) a destination RLOC field having the RLOC of the service node, resulting in a double-encapsulated data packet having an RLOC encapsulation; and
   sending the double-encapsulated data packet to the service node identified in the service chain policy.

3. The method as recited in claim 2, wherein the data exchange process further comprises:
   receiving the double-encapsulated data packet at the service node;
   removing the EID encapsulation and the RLOC encapsulation from the double-encapsulated data packet;
   forwarding the data packet to a service logic module configured to deliver a service; and
   upon delivery of service by the service logic module, re-encapsulating the data packet and sending the re-encapsulated data packet to one of the ingress node and the egress node based on optimizing a next service hop required in accordance with the service chaining policy.

4. The method as recited in claim 3, wherein the re-encapsulation of the data packet further comprises;
   appending a source EID field that includes the EID of the service node and a destination EID field that includes the SPID of the service chaining policy; and
   appending a source RLOC field that includes the RLOC of the service node and a destination RLOC field that includes the RLOC of one of the ingress node and the egress node.

5. The method as recited in claim 1, wherein the two or more service nodes are provided as part of the service provider network that is configured as a Software-Defined Network (SDN) based on one of OpenFlow protocol and Forwarding and Control Element Separation (ForCES) protocol.

6. The method as recited in claim 1, wherein the two or more service nodes are provided as part of the service provider network that is configured as a locator/identifier separation network implemented using one of Locator/Identifier Separation Protocol (LISP) protocol, Identifier/Locator Network Protocol (ILNP) protocol, Host Identity Protocol (HIP) protocol and Site Multi-homing by IPv6 Intermediation (SHIM6) protocol.

7. A network node configured to operate with a service provider network, the network node comprising:
   one or more processors; and
   a persistent memory coupled to the one or more processors, wherein the persistent memory includes instructions executable by one or more processors and configured to:
      determine a service chaining policy associated with an incoming data packet flow;
      determine a Service Path Identifier (SPID) associated with the service chaining policy;
      determine, using the SPID, Endpoint Identifiers (EIDs) and Routing Locators (RLOCs) of two or more service nodes to be traversed by the data packet flow for obtaining services in a sequential order based on the service chaining policy; and
      perform a data exchange process with the two or more service nodes using encapsulation of data packets based on the EIDs and RLOCs of the service nodes to route the data packet flow to each of the two or more service nodes according to the service chaining policy, wherein the data exchange process is initiated by the network node operating as an ingress node that receives the data packet flow and oscillates between the ingress node and an egress node that emits the data packet flow after obtaining services at the two or more service nodes, based on locations of the two or more service nodes relative to the ingress and egress nodes of the service provider network, and further wherein each of the two or more service nodes is configured to return serviced data packets of the data packet flow to a nearest one of the ingress and egress nodes after providing a service to the data packet flow, the ingress and egress nodes operating to steer the returned serviced data packets to a next service node of the service chain policy.

8. The network node as recited in claim 7, wherein the persistent memory further comprises instructions configured to:
   encapsulate an incoming data packet by appending (i) a destination EID field having the EID of a service node that must be traversed for obtaining a service thereat and (ii) a source EID field having the SPID of the service chaining policy, resulting in an EID-encapsulated data packet;

encapsulate the EID-encapsulated data packet by appending (i) a source RLOC field having an RLOC of the network node operating as the ingress node and (ii) a destination RLOC field having the RLOC of the service node, resulting in a double-encapsulated data packet having an RLOC encapsulation; and send the double-encapsulated data packet to the service node identified in the service chain policy.

9. A service node configured to operate with a service provider network, the service node comprising:

one or more processors; and a persistent memory coupled to the one or more processors, wherein the persistent memory includes instructions executable by one or more processors and configured to:

process a double-encapsulated data packet received from one of an ingress node and an egress node of the service provider network for a data packet flow requiring services at two or more service nodes in the service provider network pursuant to a service chaining policy, the processing comprising removing an EID encapsulation and an RLOC encapsulation from the double-encapsulated data packet;

forward the data packet to a service logic module configured to deliver a service; and re-encapsulate the data packet, upon delivery of service by the service logic module, and send the re-encapsulated data packet to one of the ingress node and the egress node as part of a data exchange process initiated by the ingress node and oscillates between the ingress node and the egress node, wherein each of the two or more service nodes is configured to return serviced data packets of the data packet flow to a nearest one of the ingress and egress nodes after providing a service to the data packet flow, the ingress and egress nodes operating to steer the returned serviced data packets to a next service node of the service chain policy.

10. The service node as recited in claim 9, wherein the persistent memory further comprises instructions configured to:

append a source EID field that includes the EID of the service node and a destination EID field that includes the service chaining policy's SPID received in the double-encapsulated data packet; and append a source RLOC field that includes the RLOC of the service node and a destination RLOC field that includes the RLOC of one of the ingress node and the egress node.

11. A non-transitory computer-readable medium containing instructions stored thereon which, when executed by a computer system configured to operate as an network node in a service provider network, perform the acts:

determining a service chaining policy associated with an incoming data packet flow;

determining a Service Path Identifier (SPID) associated with the service chaining policy;

if the service chaining policy involves two or more service nodes to be traversed by the data packet flow for obtaining services in a sequential order, determining Endpoint Identifiers (EIDs) and Routing Locators (RLOCs) of the one or more service nodes using the SPID of the service chaining policy; and performing a data exchange process with the two or more service nodes using encapsulation of data packets based on the EIDs and RLOCs of the service nodes to route the data packet flow to each of the two or more service nodes according to the service chaining policy, wherein the data exchange process is initiated by an ingress node that receives the data packet flow and oscillates between the ingress node and an egress node that emits the data packet flow after obtaining services at the two or more service nodes, based on locations of the two or more service nodes relative to the ingress and egress nodes of the service provider network, and further wherein each of the two or more service nodes returns serviced data packets of the data packet flow to a nearest one of the ingress and egress nodes after providing a service to the data packet flow, the ingress and egress nodes operating to steer the returned serviced data packets to a next service node of the service chain policy.

12. The non-transitory computer-readable medium as recited in claim 11, further comprising instructions configured to:

encapsulate an incoming data packet by appending (i) a destination EID field having the EID of a service node that must be traversed for obtaining a service thereat and (ii) a source EID field having the SPID of the service chaining policy, resulting in an EID-encapsulated data packet;

encapsulate the EID-encapsulated data packet by appending (i) a source RLOC field having an RLOC of the network node operating as the ingress node and (ii) a destination RLOC field having the RLOC of the service node, resulting in a double-encapsulated data packet having an RLOC encapsulation; and send the double-encapsulated data packet to the service node identified in the service chain policy.

13. The non-transitory computer-readable medium as recited in claim 11, wherein the two or more service nodes are provided as part of the service provider network that is configured as a Software-Defined Network (SDN) based on one of OpenFlow protocol and Forwarding and Control Element Separation (ForCES) protocol.

14. The non-transitory computer-readable medium as recited in claim 11, wherein the two or more service nodes are provided as part of the service provider network that is configured as a locator/identifier separation network implemented using one of Locator/Identifier Separation Protocol (LISP) protocol, Identifier/Locator Network Protocol (ILNP) protocol, Host Identity Protocol (HIP) protocol and Site Multi-homing by IPv6 Intermediation (SHIM6) protocol.

* * * * *